United States Patent
Mukherjee et al.

(10) Patent No.: US 10,271,062 B2
(45) Date of Patent: Apr. 23, 2019

(54) MOTION VECTOR PREDICTION THROUGH SCALING

(71) Applicant: Google LLC, Mountain View, CA (US)

(72) Inventors: Debargha Mukherjee, Sunnyvale, CA (US); Yaowu Xu, Saratoga, CA (US); Yuxin Liu, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 15/074,442

(22) Filed: Mar. 18, 2016

(65) Prior Publication Data

US 2017/0272770 A1    Sep. 21, 2017

(51) Int. Cl.

| | |
|---|---|
| H04N 19/51 | (2014.01) |
| H04N 19/137 | (2014.01) |
| H04N 19/577 | (2014.01) |
| H04N 19/184 | (2014.01) |
| H04N 19/573 | (2014.01) |
| H04N 19/44 | (2014.01) |
| H04N 19/176 | (2014.01) |
| H04N 19/52 | (2014.01) |
| H04N 19/463 | (2014.01) |

(52) U.S. Cl.
CPC .......... *H04N 19/51* (2014.11); *H04N 19/137* (2014.11); *H04N 19/176* (2014.11); *H04N 19/184* (2014.11); *H04N 19/44* (2014.11); *H04N 19/463* (2014.11); *H04N 19/52* (2014.11); *H04N 19/573* (2014.11); *H04N 19/577* (2014.11)

(58) Field of Classification Search
None
See application file for complete search history.

(56) References Cited

U.S. PATENT DOCUMENTS

| | | | |
|---|---|---|---|
| 7,706,447 B2 * | 4/2010 | Karczewicz | ..... H04N 21/23424 375/240.12 |
| 2008/0165860 A1 | 7/2008 | Sahraoui et al. | |
| 2011/0170602 A1 | 7/2011 | Lee et al. | |
| 2011/0200112 A1 * | 8/2011 | Won | ................. H04N 19/52 375/240.16 |
| 2012/0294363 A1 | 11/2012 | Lee et al. | |

(Continued)

FOREIGN PATENT DOCUMENTS

EP    2094017 A2    8/2009

OTHER PUBLICATIONS

Richardson et al. ( "The H.264 Advanced Video Compression Standard" 2010, p. 160).*

(Continued)

*Primary Examiner* — Kate H Luo (74) *Attorney, Agent, or Firm* — Young Basile Hanlon & MacFarlane, P.C.

(57) ABSTRACT

Motion vectors are predicted for a current block of a current frame using motion vectors from previous frames in the video stream. Temporal distances between a current frame and the one or more reference frames used to predict a current block and temporal distances between the previous frame and its reference frames are determined. Temporal distances for current frames and previous frames can be combined to weight the motion vectors and improve motion vector prediction.

14 Claims, 7 Drawing Sheets

(56) References Cited

U.S. PATENT DOCUMENTS

2013/0107964 A1   5/2013   Wahadaniah et al.
2014/0241432 A1*  8/2014   Suzuki .................. H04N 19/52
                                                    375/240.16

OTHER PUBLICATIONS

Combined Search and Examination Report in corresponding foreign Application No. GB1621551.9, dated Jun. 1, 2017.
Lin et al, "Improved Advanced Motion Vector Prediction", JCT-VC of ITU-T SG16 WP3 and ISO/IEC JTC1/SC29/WG11, 4th Meeting: Daegu, Korea, Jan. 20-28, 2011, 8 pgs.
Kim et al., "An Efficient Motion Vector Coding Scheme Based on Minimum Bitrate Prediction", IEEE Transactions on Image Processing, vol. 8, No. 8, Aug. 1, 1999, pp. 1117-1120.
Bankoski et al., "Technical Overview of VP8, an Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009, 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia System,; Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 ata Format and ecoding Guide, WebM Project", Google On2, Dec. 1, 2010, 103 pp.

* cited by examiner

MOTION VECTOR PREDICTION THROUGH SCALING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. This often involves inter prediction using motion vectors.

SUMMARY

This disclosure relates in general to encoding and decoding visual data, such as video stream data, by predicting motion vectors for a current frame using motion vectors calculated for a previous frame.

Aspects of disclosed implementations described herein include a method for encoding or decoding a video signal including frames defining a video sequence, each frame having blocks, and each block having pixels, including determining predicted motion vectors for a block of a current frame of the video sequence based on a collocated block in a previous frame of the video sequence and first and second previous reference frames of the video sequence, determining current motion vectors based on first and second current reference frames by weighting the predicted motion vectors based on temporal distances between the previous frame and the first and second previous reference frames and the current frame and the first and second current reference frames and combining with bits included in the video signal, and decoding the block using the current motion vectors.

One aspect of an apparatus described herein is an apparatus for encoding or decoding a video signal including frames defining a video sequence, each frame having blocks, and each block having pixels, including determining predicted motion vectors for a block of a current frame of the video sequence based on a collocated block in a previous frame of the video sequence and first and second previous reference frames of the video sequence, determining current motion vectors based on first and second current reference frames by weighting the predicted motion vectors based on temporal distances between the previous frame and the first and second previous reference frames and the current frame and the first and second current reference frames and combining with bits included in the video signal, and decoding the block using the current motion vectors.

These and other aspects of this disclosure are described in additional detail in the following detailed description, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

A video stream may be compressed by a variety of techniques to reduce bandwidth required transmit or store the video stream. A video stream can be encoded into a bitstream by a codec, which can involve compression, and then transmitted to a codec that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Inter-prediction, for example, uses a motion vector to identify a previously encoded and decoded block that resembles a current block to be encoded. By encoding the motion vector, and the difference between the two blocks, a decoder can re-create the current block. Intra-prediction, on the other hand, can predict a current block using information from the same frame and encode the difference between the two blocks to be decoded to recreate the current block. Encoders can encode the blocks of a frame using two or more of a plurality of inter- and intra-prediction modes and measure the rate/distortion of each mode for each block to select the prediction mode having the least distortion, as measured by calculating a sum of absolute differences (SAD), for the resulting rate, as measured by the number of bits in the encoded bitstream, for example.

Some codecs can reduce the number of bits to be transmitted in the video stream by predicting the current motion vectors associated with a current block of a current frame. Current motion vectors can be predicted using predicted motion vectors based on previously encoded blocks in the current frame. The predicted motion vectors can be weighted in different fashions to compensate for differences in reference data between the current motion vectors and the predicted motion vectors.

The teachings herein describe the use of reference motion vectors from collocated blocks from previous frames from the video stream to form current motion vectors. The reference motion vectors can be weighted by determining the differences in temporal distances between the previous frame, which can be a current reference frame, and the previous reference frame and the current frame and the current reference frames. In smoothly changing video, the collocated blocks from previous frames temporally near the current frame including one or more of the current reference frames is most likely to have motion vectors similar to the current block. This means the number of bits required to communicate the difference between the predicted motion vectors and the current motion vectors can be predictably small and therefore able to be transmitted in a small fixed number of bits.

Predicting current motion vectors using weighted predicted motion vectors from previous frames can be indicated to a decoder by setting bits in the video stream to indicate that the current block is encoded using weighted predicted motion vectors. The decoder can keep track of the temporal distances associated with reference images by resetting the temporal distances each time a new I-frame, or golden frame is received by the decoder. Then the temporal distances are updated each time a frame is processed by the decoder. If the temporal distance is associated with a frame used for forward prediction, the update can include increasing the temporal offset of the reference frame from the current frame. If the temporal distance is associated with a frame used for backward prediction, the update can include decreasing the temporal offset of the reference frame from the current frame. Encoding video data using predicted motion vectors as described herein can have improved rate/distortion measures over blocks encoded without this technique.

Figure 1:
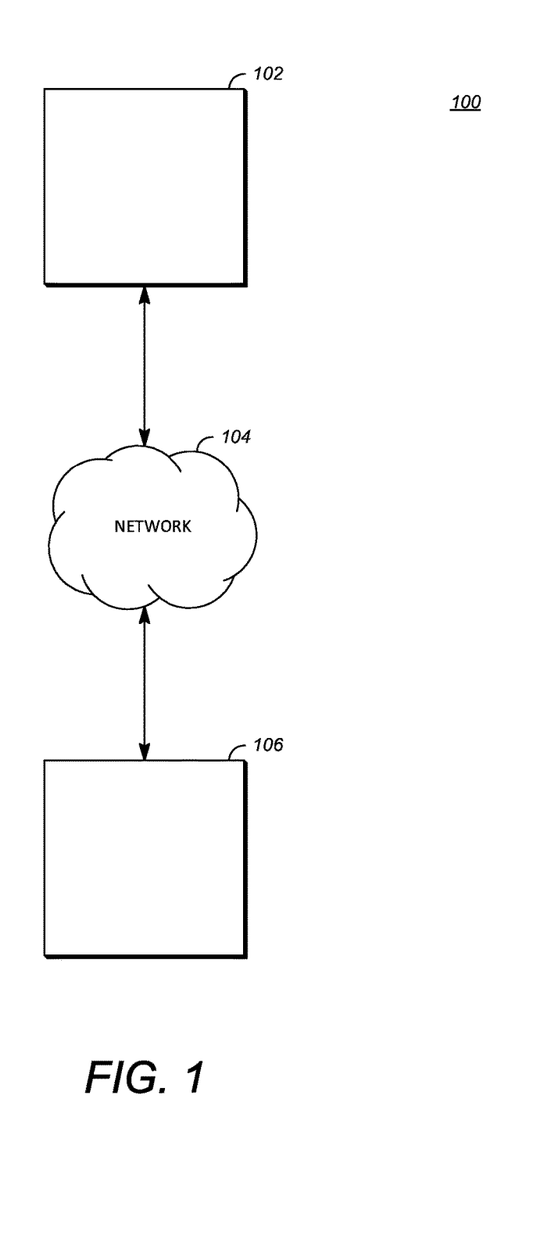
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
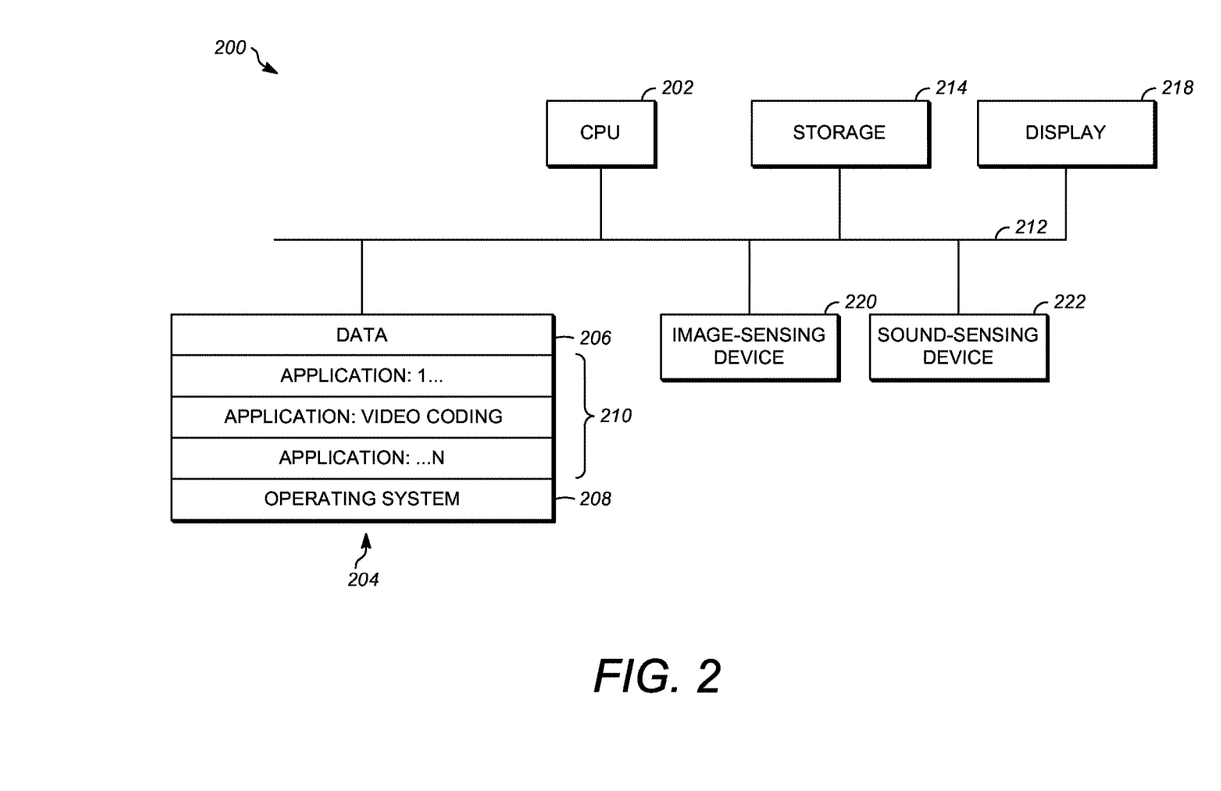
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext-Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
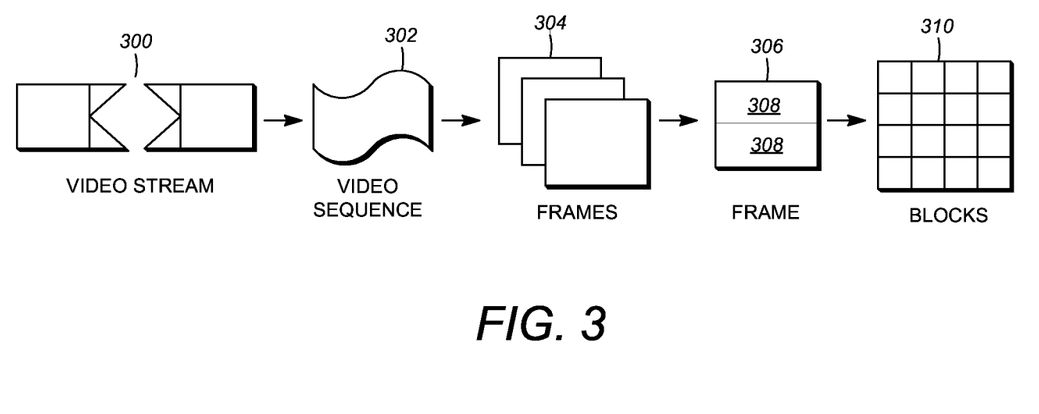
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in frame 306. The blocks 310 can also be arranged to include data from one or more planes of pixel data. The blocks 310 can also be of any other suitable size such as 4×4 pixels, 8×8 pixels, 16×8 pixels, 8×16 pixels, 16×16 pixels or larger. Unless otherwise noted, the term block includes macroblock. The frame 306 may be partitioned according to the teachings herein as discussed in more detail below.

Figure 4:
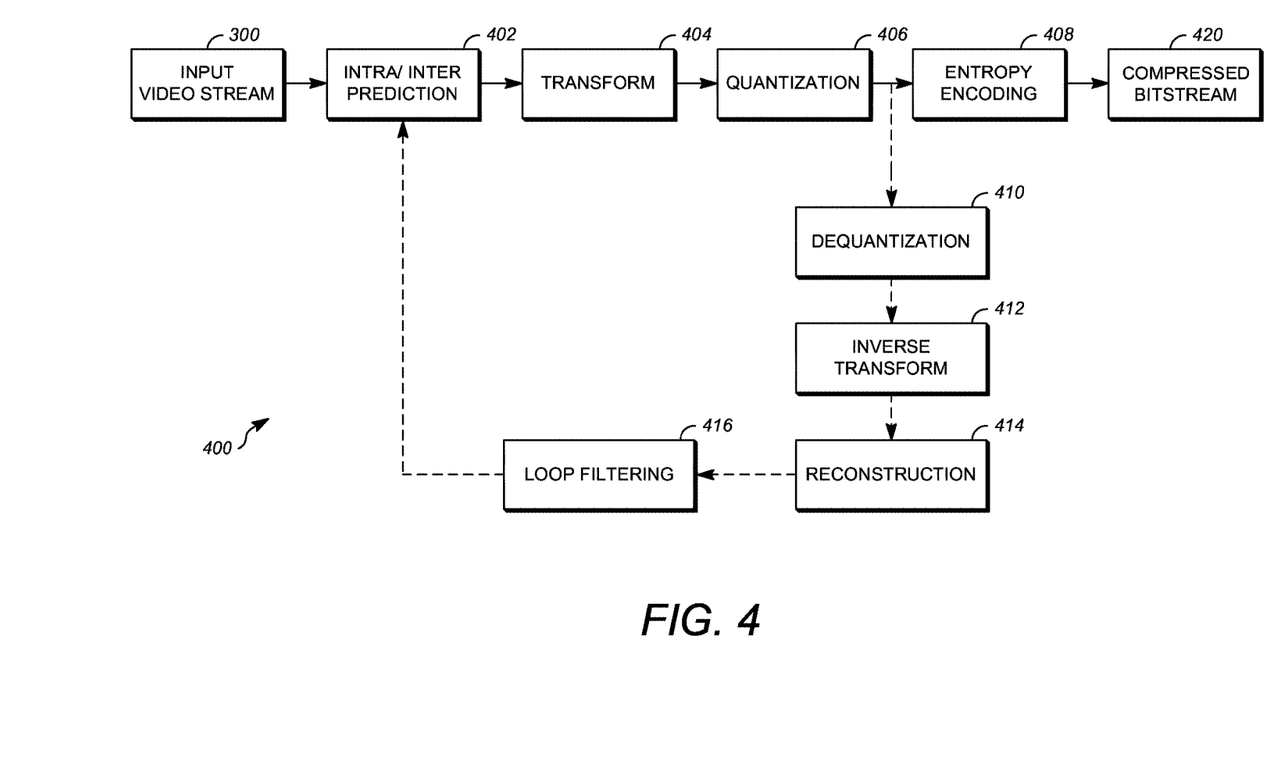
FIG. 4 is a block diagram of an encoder according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra prediction) or inter-frame prediction (also called inter prediction or inter-prediction herein). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames as discussed in more detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
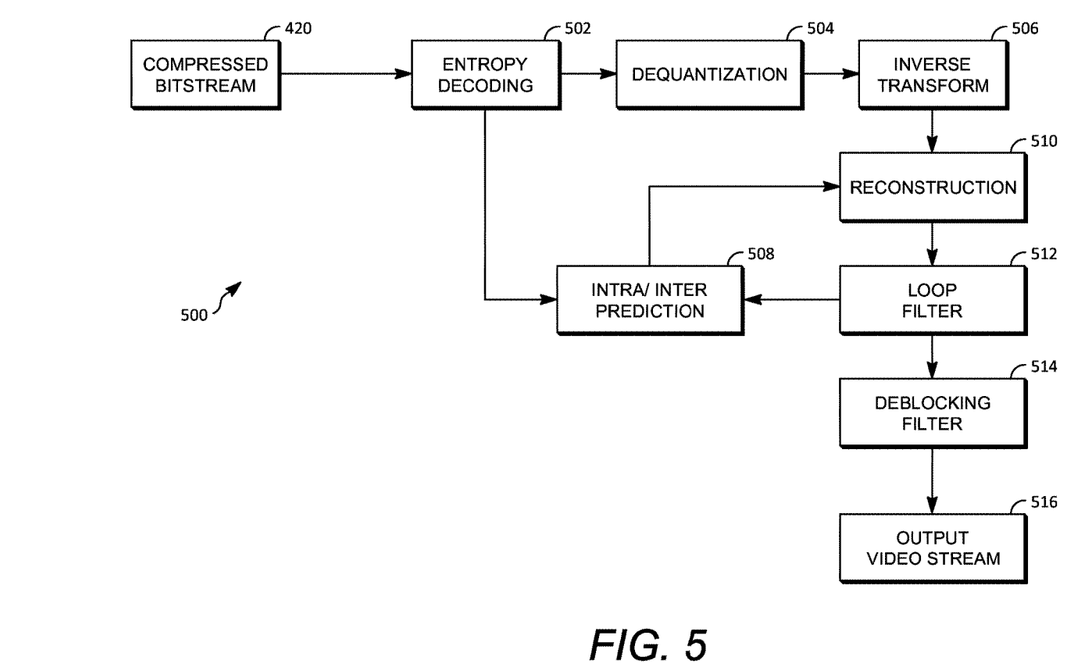
FIG. 5 is a block diagram of decoding according to an aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

Figure 6:
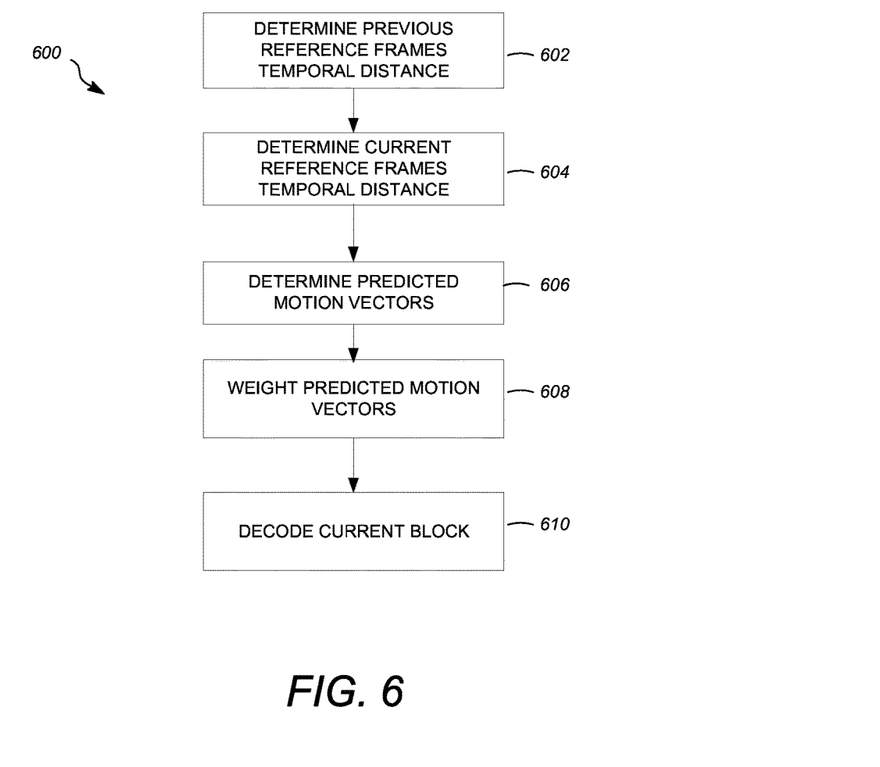
FIG. 6 is a flowchart diagram of a process for encoding or decoding a block by predicting motion vectors according to one implementation of this disclosure.

FIG. 6 is a flowchart diagram of a process 600 for encoding or decoding a block by motion vector prediction using previous frames according to one implementation of this disclosure. The method or process 600 can be implemented in a system such as the computing device 200 to aid the encoding or decoding of a video stream. The process 600 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 600. The process 600 can also be implemented using hardware in whole or in part. As explained above, some computing devices may have multiple memories and multiple processors, and the steps or operations of the process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, the process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. The process 600 may be repeated for each frame of the input signal.

When the process 600 is an encoding process, the input signal can be, for example, the video stream 300. The input signal can be received by the computing device 200 performing the process 600 in any number of ways. For example, the input signal can be captured by the image-sensing device 220 or received from another device through an input connected to the bus 212. The input signal could be retrieved from the secondary storage 214 in another implementation. Other ways of receiving and other sources of the input signal are possible. For example, when the process 600 is a decoding process, the input signal can be an encoded bitstream such as the compressed bitstream 420.

Video compression schemes can first divide an image frame into large blocks. An encoder may recursively break large blocks down into smaller blocks. These recursive relationships between blocks can be represented by one or more tree structures. For each block that represents a leaf node on the tree structure, the encoder may select intra or inter prediction to produce a prediction block. An encoder can then encode a residue block formed using the prediction block using lossless algebraic coding. Aspects of disclosed implementations include a new prediction mode for producing better prediction blocks for difficult to predict blocks in order to improve the quality of prediction, and therefore improve overall coding efficiency.

In video compression schemes, coding of individual blocks can be either based on intra prediction or inter prediction. In the case of inter prediction, the prediction modes can include modes indicating motion vector prediction using motion vectors generated for blocks in the same frame as the current block. Aspects disclosed herein include new prediction modes indicating motion vector prediction using weighted motion vectors associated with blocks of a previous frame collocated with blocks of a current frame.

Figure 7:
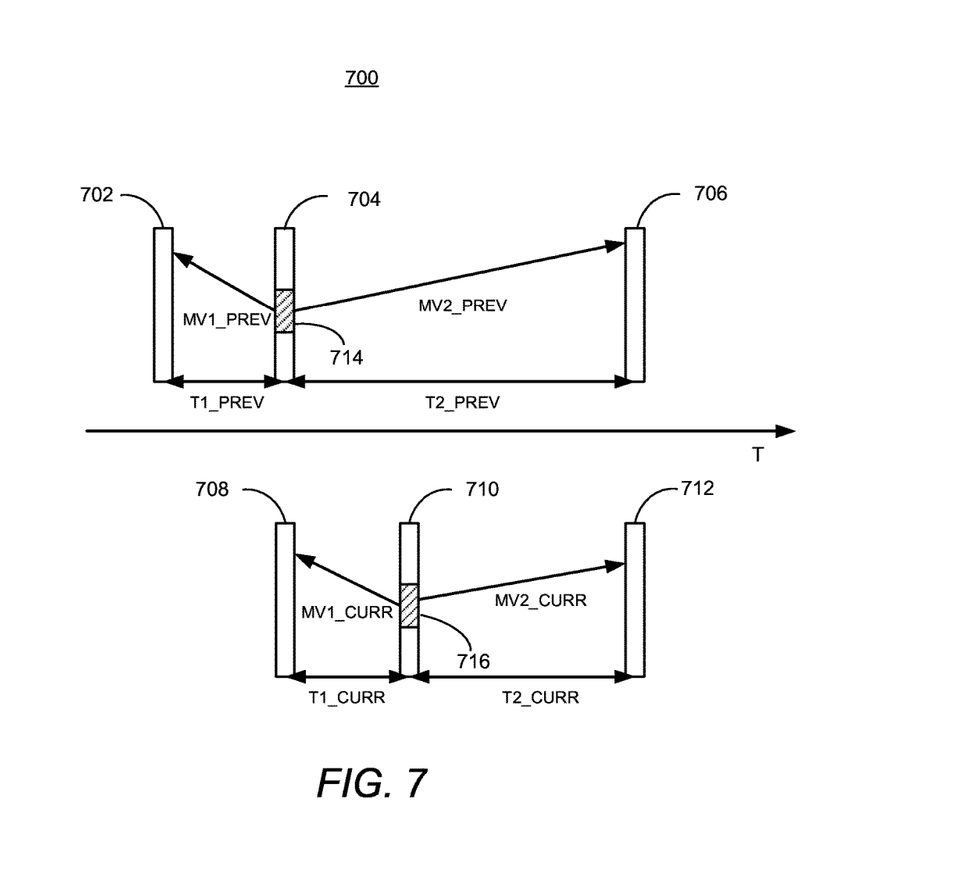
FIG. 7 is a diagram used to explain the process of FIG. 6.

FIG. 7 is a diagram showing frames 702, 704, 706, 708, 710, 712 of a video stream 700 along timescale T. Video stream 700 includes a current frame 710 and a current block 716. Video stream also includes collocated block 714 of previous frame 704. Collocated block 714 is collocated with current block 716. In smoothly changing video, collocated blocks can have motion vectors very similar to motion vectors of current blocks. Collocated block 714 includes motion vectors indicated by vectors labeled MV1_PREV and MV2_PREV. Collocated block also includes temporal distances T1_PREV and T2_PREV. FIG. 7 also shows current block 716 of current frame 710 having motion vectors indicated by vectors labeled MV1_CURR and MV2_CURR. Current block also includes temporal distances T1_CURR and T2_CURR.

A motion vector represents a temporal correlation between different video frames, and such correlation is tightly related to the time interval elapsed between the current frame and its reference frame. As shown in FIG. 7 for the collocated block in the previously coded frame, it may have up to 2 motion vectors, one forward (MV1_PREV) referring to a reference frame in the past and one backward (MV2_PREV) referring to a reference frame in the future. T1_PREV indicates the time interval between the previous frame and its forward reference frame, whereas T2_PREV indicates the time interval between the previous frame and its backward reference frame. Similarly, the current frame may also have up to 2 motion vectors, MV1_CURR and MV2_CURR, and two time intervals T1_CURR and T2_CURR indicate the time between the current frame and its own forward and backward reference frames.

Assuming the majority of the translational motion between frames are smooth, the time interval(s) between the previous frame and its references may be examined, and compared with the time interval(s) between the current frame and its own reference(s). The previous motion vector of the collocated block can be correspondingly scaled to match the ratio between the two time intervals and then used as a motion vector reference candidate, for the encoding of the current motion vector.

For instance, to encode the forward motion vector MV1_CURR for the current block, we may use either MV1_PREV or MV2_PREV, if they are available, as the motion vector reference candidates, for the encoding of MV1_CURR:

Motion Vector Reference Candidate 1: MV1_PREV/T1_PREV*T1_CURR
Motion Vector Reference Candidate 2: MV2_PREV/T2_PREV*T1_CURR Similarly, we may obtain two motion vector reference candidates for the encoding of MV2_CURR:

Motion Vector Reference Candidate 1: MV1_PREV/T1_PREV*T2_CURR
Motion Vector Reference Candidate 2: MV2_PREV/T2_PREV*T2_CURR Returning to FIG. 6, at step 602 process 600 can determine previous frame temporal distances for collocated block 714, for example T1_PREV and T2_PREV. Aspects of disclosed implementations can determine T1_PREV and T2_PREV by examining bits associated with a collocated block 714, for example. These bits are reset upon receipt of an I-frame and can indicate temporal distance by coding it as an offset in frames from the current frame. As the decoder processes frames, the offsets can be updated to represent the correct temporal distances as the frames advance by incrementing the offset if the frame is used for forward prediction and decrementing the offset if the frame is used for backward prediction.

At step 604 process 600 can determine current frame temporal distances for current block 716, for example T1_CURR and T2_CURR. Aspects of disclosed implementation can determine T1_CURR and T2_CURR from information included in video stream 700 to perform motion prediction. A step 606 process 600 can determine previous motion vectors MV1_PREV and MV2_PREV from bits included in the video stream and stored at the collocated block 714, for example. At step 608 the process 600 can weight the previous motion vectors based on the combination of the current temporal distances with the previous temporal distances. As can be seen in FIG. 7, since temporal distances T1_PREV and T2_PREV can different from temporal distances T1_CURR and T2_CURR, the vectors MV1_PREV and MV2_PREV can be different from vectors MV1_CURR and MV2_CURR. The previous motion vectors MV1_PREV and MV2_PREV of the co-located block can be correspondingly weighted or scaled to match the ratio between the two time intervals. Such weighted or scaled motion can provide an effective prediction for the encoding of the current motion vectors.

Returning to FIG. 6, at step 610 the process 600 decodes current block 716. The current block 716 can be decoded using current motion vectors formed by adding the motion vectors transmitted in the video stream for a current block 716 with the weighted predicted motion vectors MV1_PREV and MV1_PREV from step 608 to generate current motion vectors MV1_CURR and MV2_CURR. The current motion vectors MV1_CURR and MV2_CURR are used with current reference frames 708, 712 to predict current block 716.

Encoding a block according to aspects of disclosed implementations includes determining the weighted predicted motion vectors MV1_PREV and MV2_PREV and subtracting from the current motion vectors MV1_CURR and MV2_CURR and encoding the difference into the video stream as a small fixed number of bits as the motion vectors along with bits indicating that this inter prediction mode uses collocate blocks in previous frames. Hence, disclosed aspects add bits representing temporal information to the frame header of each reference frame. Currently, in some codecs, a single sign bit is associated with each reference frame, indicating whether the reference frame is located temporally ahead or behind the current frame. Further temporal information can be added to each of the reference frames, for example, a fixed number of bits can be used to encode the temporal distance (interval) between the current coded frame and the reference frame. Using such temporal distance info, more temporal motion vector reference candidates can be obtained to more effectively encode the current motion vectors. Such scaled motion vector processing can provide a new inter prediction coding mode in codecs for more efficient coding.

Adding temporal information to the frame header for each reference frame can incur a bitrate cost penalty. To effectively encode such temporal information aspects of disclosed implementations keep track of the update on the reference frame buffer. For example, when the reference frame buffer gets updated, if an I-frame or key frame is being coded and placed in the reference frame buffer, the absolute value of the time interval for each reference frame may be coded and written to the video stream. Otherwise if an I-frame is being coded and written to the video stream, for those reference frames that do not get refreshed and stay in the reference buffer for the coding of the next frame, their corresponding time interval may get recalculated accordingly, without needing any additional information in the bitstream as follows. If the reference frame is used for a forward prediction, its time interval increases by one frame interval. Otherwise if it is used for a backward prediction, its time interval decreases by one frame interval. If a reference frame gets refreshed, its time interval will then get reset and the corresponding absolute value is coded and written to the bitstream. In this fashion the number of bit describing the motion vectors can be minimized while retaining the same decoded video quality.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a video signal using a computing device, the video signal including frames defining a video sequence, the frames having blocks, and the blocks having pixels, the method comprising:
   receiving the video signal as encoded;
   determining, from the video signal, previous motion vectors for a block of a current frame of the video sequence based on a collocated block in a previous frame of the video sequence and first and second reference frames of the previous frame;
   determining predicted motion vectors for the block of the current frame based on first and second reference frames of the current frame by weighting the previous motion vectors based on temporal distances between the previous frame and the first and second reference frames of the previous frame, and temporal distances between the current frame and the first and second reference frames of the current frame, wherein the first and second reference frames are identified in a reference frame buffer of candidate reference frames, each of the candidate reference frames is identified by a bit as being temporally ahead of or behind the current frame, the temporal distances are offsets from the current frame, and a temporal distance of the temporal distances is initially encoded as an offset from an I-frame and is updated in the reference frame buffer each time a next frame of the video sequence is processed while a corresponding candidate reference frame remains in the reference frame buffer and when a new I-frame is transmitted;

determining current motion vectors for the block of the current frame by combining the predicted motion vectors with motion vector differences represented by bits included in the video signal;

decoding the block using the current motion vectors; and storing or outputting the block as decoded.

2. The method of claim 1, wherein decoding the block is based on further bits included in the video signal indicating a coding mode, and wherein combining the predicted motion vectors with the motion vector differences comprises adding the motion vector differences to the predicted motion vectors.

3. The method of claim 1, wherein the temporal distances are indicated by a fixed number of bits included in a frame header for each of the first and second reference frames of the current frame.

4. The method of claim 1, wherein updating the offset includes increasing the offset by one frame interval if the frame is used for forward prediction.

5. The method of claim 1, wherein updating the offset includes decreasing the offset by one frame interval if the frame is used for backward prediction.

6. A method for encoding a video signal using a computing device, the video signal including frames defining a video sequence, the frames having blocks, and the blocks having pixels, the method comprising:

determining previous motion vectors for a block of a current frame of the video sequence based on a collocated block in a previous frame of the video sequence and first and second reference frames of the previous frame, wherein each of the first and second reference frames is identified by a bit as being temporally ahead of or behind the current frame, the temporal distances are offsets from the current frame, and a temporal distance of the temporal distances is initially encoded as an offset from an I-frame and is updated in a reference frame buffer each time a next frame of the frame is processed while the reference frame remains in the reference frame buffer and when a new I-frame is transmitted;

determining predicted motion vectors for the block of the current frame based on first and second reference frames of the current frame by weighting the previous motion vectors based on temporal distances between the previous frame and the first and second reference frames of the previous frame, and temporal distances between the current frame and the first and second reference frames of the current frame;

determining bits for inclusion in the video signal by subtracting the predicted motion vectors from current motion vectors for the block of the current frame;

encoding the block using the current motion vectors;

including the encoded block and the bits within the video stream; and storing or transmitting the video stream as encoded.

7. The method of claim 6, wherein encoding the block includes including further bits included in the video signal indicating a coding mode.

8. The method of claim 6, wherein the temporal distances are indicated by a fixed number of bits included in the video signal indicating the temporal distances between the current frame and the first and second reference frames of the current frame, and between the current frame and the first and second reference frames of the previous frame.

9. The method of claim 6, wherein updating the offset includes increasing the offset by one frame interval if the frame is used for forward prediction.

10. The method of claim 6, wherein updating the offset includes decreasing the offset by one frame interval if the frame is used for backward prediction.

11. An apparatus for decoding a video signal, the video signal including frames defining a video sequence, the frames having blocks, and the blocks having pixels, the apparatus comprising:

a processor; and a non-transitory memory that stores includes instruction causing the processor to perform a method including:

receiving the video signal as encoded;

determining, from the video signal, previous motion vectors for a block of a current frame of the video sequence based on a collocated block in a previous frame of the video sequence and first and second reference frames of the previous frame;

determining predicted motion vectors for the block of the current frame based on first and second reference frames of the current frame by weighting the previous motion vectors based on temporal distances between the previous frame and the first and second reference frames of the previous frame, and temporal distances between the current frame and the first and second reference frames of the current frame, wherein the temporal distances are encoded as offsets from the current frame, and a temporal distance of the temporal distances is initially encoded as an offset from an I-frame and is updated each time a frame is processed and when a new I-frame is transmitted;

determining current motion vectors for the block of the current frame by combining the predicted motion vectors with motion vector differences represented by bits included in the video signal;

decoding the block using the current motion vectors; and storing or outputting the block as decoded.

12. The apparatus of claim 11, wherein decoding the block is based on further bits included in the video signal indicating a coding mode, and wherein combining the predicted motion vectors with the motion vector differences comprises adding the motion vector differences to the predicted motion vectors.

13. The apparatus of claim 11, wherein the temporal distances are indicated by a fixed number of bits included in the video signal.

14. The apparatus of claim 11, wherein updating the offset includes increasing the offset by one frame interval if the frame is used for forward prediction.

* * * * *